United States Patent [19]
Sato et al.

[11] Patent Number: 5,287,419
[45] Date of Patent: Feb. 15, 1994

[54] IMAGE SIGNAL PROCESSER REPRODUCING HALFTONE IMAGES IN A RECORDING SYSTEM PRINTED THICKENED OR THINNED DOTS

[75] Inventors: Shinichi Sato, Yokohama; Kazuto Kobayashi, Tokyo, both of Japan

[73] Assignee: Matsushita Graphic Communication Systems, Inc., Tokyo, Japan

[21] Appl. No.: 17,579

[22] Filed: Feb. 4, 1993

Related U.S. Application Data

[62] Division of Ser. No. 767,719, Sep. 30, 1991.

[30] Foreign Application Priority Data

Oct. 9, 1990 [JP] Japan .................. 2-271145
Oct. 9, 1990 [JP] Japan .................. 2-271146

[51] Int. Cl.[5] ............................................. G06K 9/38
[52] U.S. Cl. ....................................... 382/50; 382/54; 358/455; 358/456; 358/458; 358/459
[58] Field of Search ............... 358/456, 458, 455, 459; 382/50-54; G06K 9/38, 9/40; H04N 1/40, 1/04

[56] References Cited

U.S. PATENT DOCUMENTS 4,538,184  8/1985  Otsuka et al. .................. 382/50
4,924,509  5/1990  Yokomizo ........................ 382/50
4,969,052 11/1990  Ishida et al. .................... 382/50
5,159,470 10/1992  Ishida et al. .................... 382/50

Primary Examiner—Jose L. Couso
Attorney, Agent, or Firm—Lowe, Price, LeBlanc & Becker

[57] ABSTRACT

An error distribution type image signal processor has a preprocessing unit consisting of a spatial filter for preprocessing input image signals of pixels, a recording dot correction factor setter for setting a correction factor based on a difference between an actual dot size and a theoretical dot size, an output image memory for storing output image signals obtained by binarizing the input image signals preprocessed, an error data corrector for correcting error data defined as a difference between the input image signals preprocessed and the output image signals binarized according to the correction factor and the output image signals binarized, an error data memory for storing corrected error data output from the error data corrector, and an error filter for weighting the corrected error data of pixels adjoining a pixel of interest and adding the corrected error data to an input image signal of the pixel of interest. Therefore, the error data are precisely corrected, and a halftone image with a smooth gradation is reproduced in a wide tonal range.

7 Claims, 12 Drawing Sheets

FIG. 3
*PRIOR ART*

| O | −A (a) | O |
|---|---|---|
| −A (b) | 1+4·A (p) | −A (d) |
| O | −A (c) | O |

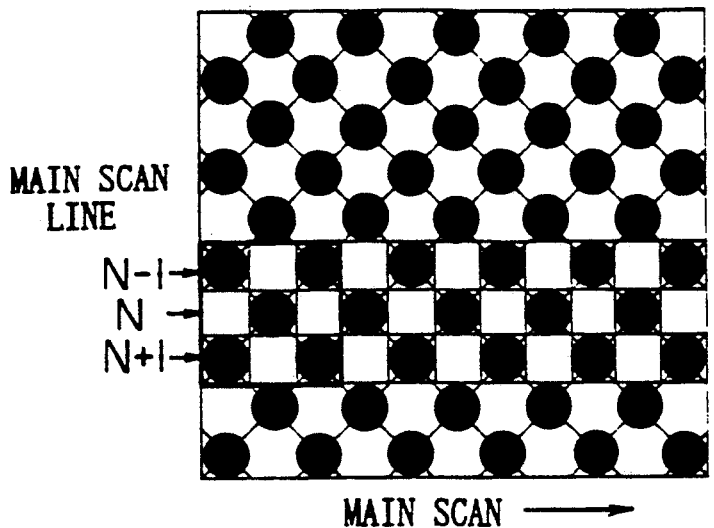
FIG. 4(a)A
PRIOR ART
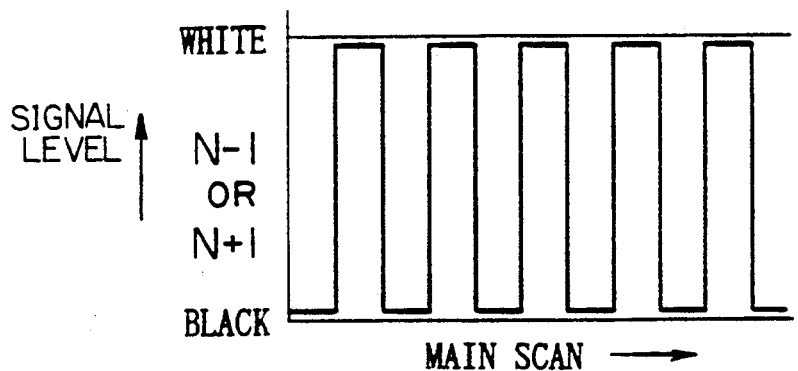
FIG. 4(a)B
PRIOR ART
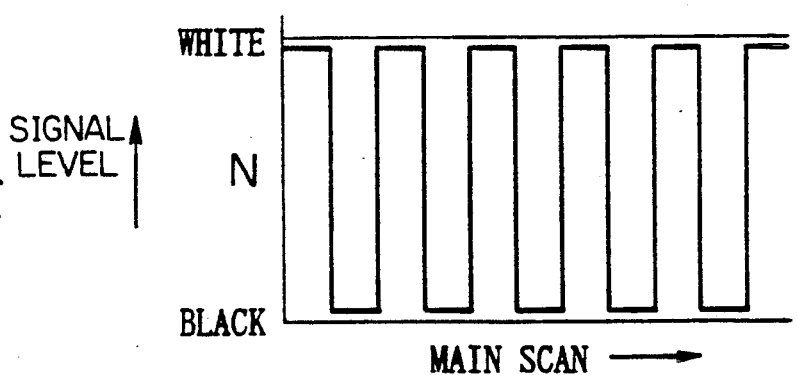
FIG. 4(a)C
PRIOR ART

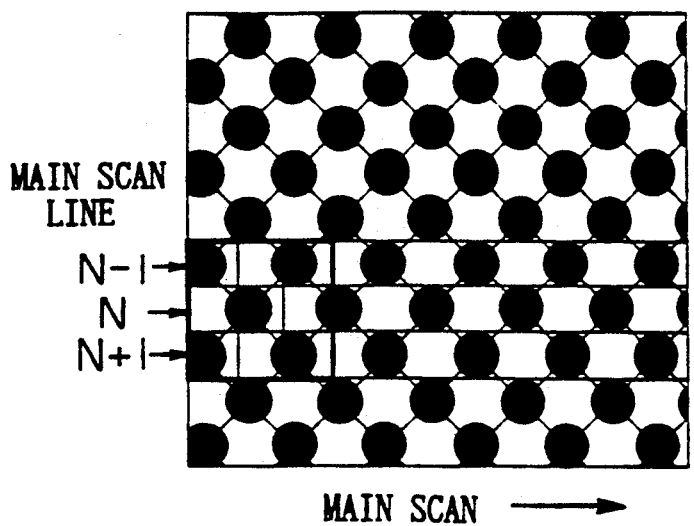
FIG. 4(b)A
PRIOR ART
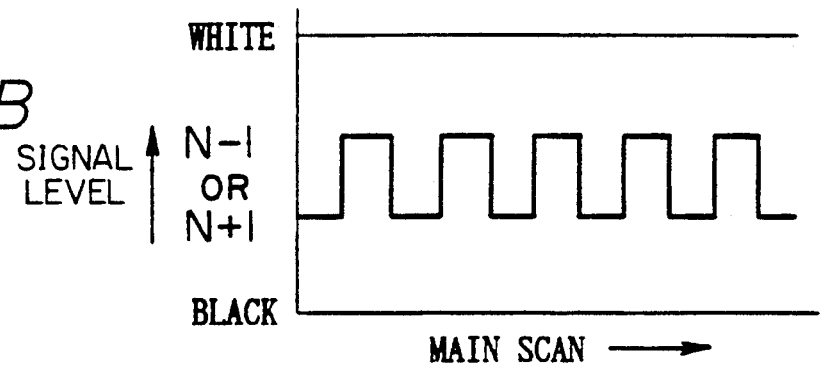
FIG. 4(b)B
PRIOR ART
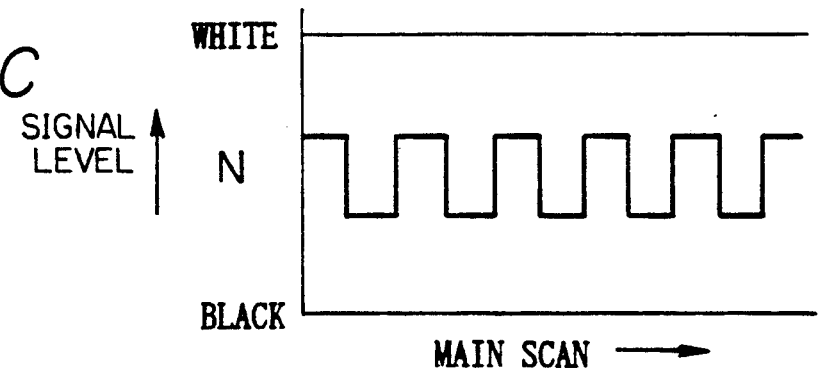
FIG. 4(b)C
PRIOR ART

INPUT IMAGE DATA SIGNAL

MULTI LEVEL ($f\ mn$)

$\Sigma\ f\ mn = 50\ (\%)$

BINARIZED SIGNAL

BINARY LEVEL ($g\ mn$)

$\Sigma\ g\ mn = 50\ (\%)$

RECORDED IMAGE $\Sigma\ g\ mn = 40\ (\%)$ $\Sigma\ g\ mn = 40\ (\%)$ $\Sigma\ g\ mn = 45\ (\%)$

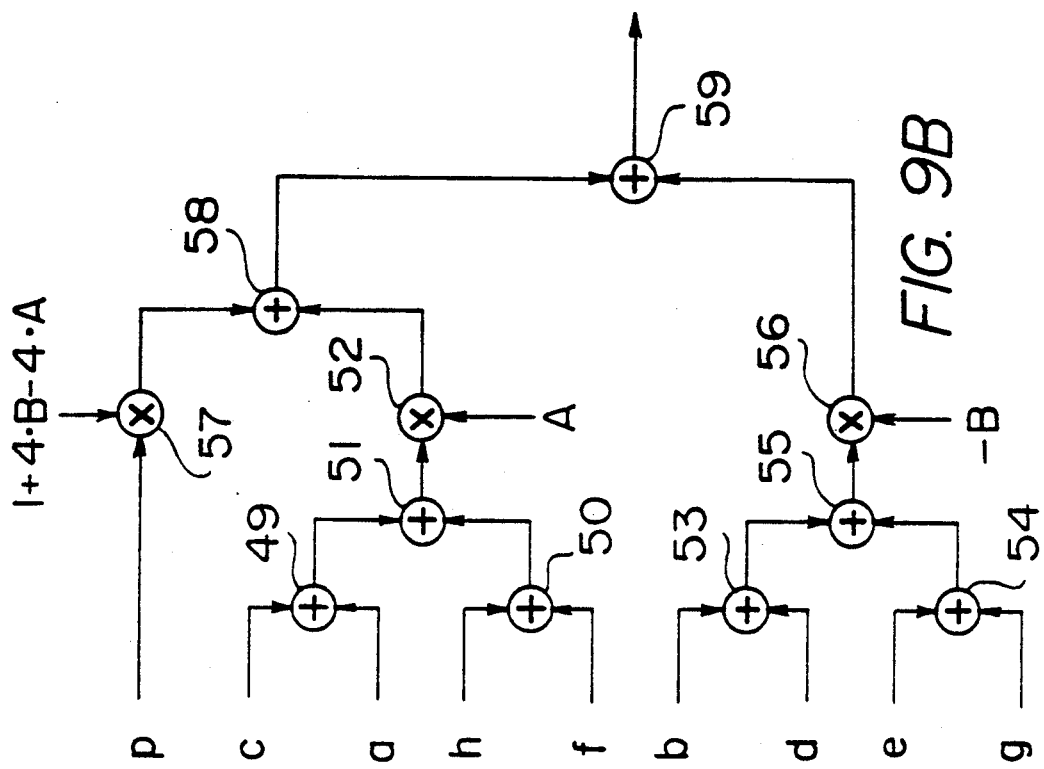
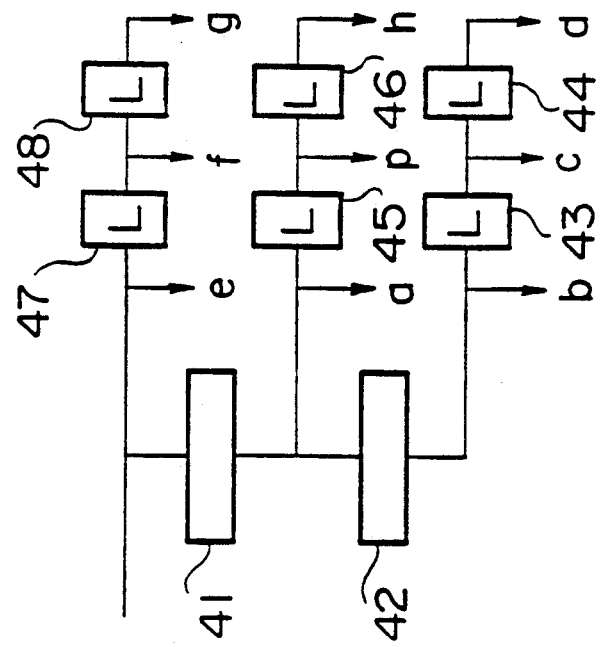
FIG. 9B
FIG. 9A

FIG. 10

| -B  (b) | A   (c)     | -B  (d) |
|---------|-------------|---------|
| A   (a) | 1+4B-4A (p) | A   (h) |
| -B  (e) | A   (f)     | -B  (g) |

IMAGE SIGNAL PROCESSER REPRODUCING HALFTONE IMAGES IN A RECORDING SYSTEM PRINTED THICKENED OR THINNED DOTS

This application is a division of U.S. application Ser. No. 07/767,719 filed Sep. 30, 1991.

BACKGROUND OF THE INVENTION

1. Field of the Invention

The present invention relates to an image signal processor used in facsimiles and scanners.

2. Description of the Prior Art

In conventional apparatuses of this kind, the objects to be processed are primarily characters and the size of a dot in a recording system is set slightly larger than the size of a corresponding theoretical picture element or pixel to reproduce smooth characters in continuous lines.

FIG. 1 shows the outline configuration of the conventional image signal processor. In the figure, reference numeral 1 represents a preprocessor which receives image information, in a multiple level, on a text image divided into component pixels by a scanner and which performs preprocessing on the image information received. Denoted 2 is an adder that adds up the image signal fed from the input terminal I and an output from an error filter described later. A threshold generator 3 produces a threshold value used in binarizing the output of the adder 2, i.e., transforming it into a binary signal. A comparator 4 converts the output of the adder 2 into a binary signal according to the threshold value generated by the threshold generator 3. The binary signal of the comparator 4 is sent out from an output terminal 5. A subtractor 6 subtracts the output of the comparator 4 from the output of the adder 2. An error data memory 7 stores the output of the subtractor 6 as error data. An error filter 8 assigns weight to each of the error data for the binarized signals of pixels adjoining the pixel of interest and sums up the weighted error data.

The preprocessor 1 consists of a Laplacean space filter and corrects the input image signal to make the image sharp.

FIG. 2 shows the outline configuration of the preprocessor I in the conventional image signal processor. FIG. 3 shows a matrix indicating the coefficients of the filter.

In FIG. 2, reference numerals 11, 12 indicate one-line buffers that store image information of one line in the main scan direction. Designated 14, 15, 16 are latch circuits that output image information on pixels p, d, c in the matrix of FIG. 3 out of the image information stored in the one-line buffers 11, 12. Denoted 13 is a latch circuit that generates image information of the pixel a in the matrix. Adders 17, 18, 19 add information of pixels adjoining the pixel of interest in the matrix. A multiplier 20 multiplies with a negative coefficient the result of addition of the surrounding pixels obtained from the three adders. A multiplier 21 multiplies the pixel of interest, i.e., the center pixel in the matrix, with a coefficient which is so adjusted that the overall coefficient of the filter is unity. An adder 22 adds up the results from the multipliers 20, 21 to produce the sum of the pixel of interest and the surrounding pixels, both multiplied by their assigned filter coefficients.

The space filter, as shown in FIG. 3, has a negative filter coefficient assigned for pixels adjoining the pixel of interest in the main and sub scan directions and a zero or negative filter coefficient assigned for pixels adjoining the pixel of interest in diagonal directions.

In such a conventional image signal processor, a scanner not shown feeds image information of text as multi-level signals of pixels to the input terminal. The input data is processed by the filter in the preprocessor 1 of FIG. 2. In this filter, the multi-level signals output from the latches 13, 14, 15, 16 are taken to be a, p, d, c. Of the multi-level signals at the output of the one-line buffer 11, a multi-level signal of a pixel adjoining the center pixel P one the side opposite to the scan direction is taken as b in FIG. 3. The pixel of interest P and the surrounding pixels a, b, c, d are multiplied by filter coefficients to amplify the high-frequency components in the main and sub scan directions to correct the fuzziness and sharpens the image.

The image signal subjected to the above preprocessing is entered into the adder 2. The adder 2 adds the output of the error filter 8 to the image signal thus entered. Then, the comparator 4 binarizes the output of the adder 2 according to the threshold value supplied by the threshold generator 3. The binary signal produced by the comparator 4 is fed to the output terminal 5. The subtractor 4 subtracts the output of the comparator 4 from the output of the adder 2 and stores the result as error data in the error data memory 7. The error filter 8 assigns weight of one-fourth to each of the error data (Error(a) to Error (d)) for the binarized signals of and then sums up the weighted error data (Error(a) to Error(d)). The output of the error filter is added to the input image signal by the adder 2, as described earlier.

In this way, the error between the input image signal and the output image signal, which is the input image signal binarized, is scattered over the surrounding pixels to realize a halftone image reproduction with improved tone fidelity and increased resolution.

The above conventional image signal processor, however, has a drawback. When a photographic image with a screen of 133–150 lines arranged at a common screen angle of 45° is read in at the resolution of 4 line-pairs/mm and processed by the filter to sharpen the image, the image formed of multi-level signals from the filter has a conspicuous moire.

This is caused by the existence of a frequency component (133 lines: about 3.8 line-pairs/mm; 150 line: about 4.2 line-pairs/mm) on the screen image near a sampling frequency (4 line-pairs/mm).

FIG. 4 shows the phase relationship between the sampling frequency used in reading or scanning and the screen image. Nine pixels enclosed in a thick box in the figure correspond to the pixels a–h, P in the spatial filter shown in FIG. 10.

At positions on the image formed of multi-level signals which are entered, one pixel at a time, into the space filter -where the phase of the sampling frequency agrees with that of the screen image, as shown in FIG. (a), the image signal alternates to the extreme levels from one pixel to another. At positions where the phases do not coincide, as shown in FIG. 4(b), the image signal assumes an intermediate level according to the pattern of the screen. When the image signals supplied in these multiple levels are processed by the conventional Laplacean spatial filter, the they are amplified, emphasizing the distinction between black and white at locations where the sampling phase and the screen image phase agrees as shown in FIG. 4(a).

At locations on the screen image where the phases do not agree as shown in FIG. 4(b), the nine pixels in the matrix of FIG. 3 produce less distinction between black and white, resulting in a halftone. The matching and mismatching between the sampling phase and the screen image phase result in an emphasized tone difference between the corresponding two areas, causing a marked moire in the filtered image.

In the conventional Laplacean filter the alternating pixel image signal is emphasized by the spatial frequency characteristic of the filter, which is shown in FIG. 5. FIG. 5 shows the amplitude characteristic of the spatial filter over a two-dimensional plane extending from the pixel of interest in the main and sub scan directions. As seen from the relationship, shown in FIG. 4, between the sampling frequency and the number of pixels, FIG. 5 illustrates the spatial frequency-versus-amplitude characteristic, which is obtained from the calculation of matrix made up of a pixel of interest and adjacent pixels. As shown in FIG. 5, the conventional Laplacean filter has a characteristic of amplifying high frequency components in the main and sub scan directions and at the same time amplifying to a greater extent high frequency components in diagonal directions. Hence, the pixel image signals most affected by this filter are the ones whose power spectra extend in the diagonal or 45° direction as in the case of FIG. 4(a), where the sampling frequency matches the frequency component of the screen. This produces a conspicuous moire.

The moire may be removed by taking an arithmetical mean of two adjacent pixels lined in the main scan direction to convert the pixel image signals into an average level during the preprocessing performed prior to the conventional Laplacean filter processing. The arithmetic mean operation, however, makes it impossible to provide sharp pixel images nor reproduce alternating line image such as a resolution pattern.

Further, in the conventional image signal processor, the operation of the circuits after the preprocessor 1 requires that the sum of the densities of multi-level image signals ($\Sigma fmn$) should equal the sum of the densities of the binarized signals ($\Sigma gmn$).

FIG. 6 shows the total of densities of the input image signals and that of the output image signals. FIG. 6(a) represents the input image signals that are received in the multiple levels. Let us assume that the black/white density in this area is 50%. FIG. 6(b) shows the binarized signals, which represent the theoretical output corresponding to the input image signals of FIG. 6(a). The total of the densities of the output image signals is 50%. FIG. 6(c) shows the result of output actually produced by the recording system based on the binarized signals of FIG. 6(b). The sum of the densities of the output image signals is 40%.

In this way, the dot size in the recording system that records a halftone image may become larger than a theoretical dot size (this phenomenon is referred to as thickening for convenience) or smaller (thinning). Such phenomena give rise to a problem of degraded tone fidelity in the image reproduction, including a reduced number of gradation levels that can be reproduced and a degraded tone continuity.

To solve this problem, it has been conceived to add to the apparatus a gamma convertor that performs density conversion to make the input image either darker or lighter before the image processing is carried out.

The apparatus with the additional gamma convertor, however, has another problem that the number of tone levels of the image signals output from the gamma convertor becomes smaller than that of the input image signals, making it impossible to fully compensate for the degraded tone fidelity in the reproduction of a halftone image. Although this problem can be solved by increasing the number of tone levels in the input image signal supplied to the gamma convertor (i.e., increasing the number of bits), an increase in the number of bits in the input image signal requires increasing the number of bits in the image signal processing unit arranged before the gamma convertor, giving rise to another problem of an increased volume of processing. There is still another problem. When the tone level of the input image signal is monotonously increased, the tone level of the output image signal also monotonously increases in the case of a theoretical dot. However, if the dot prints thicker or thinner than required, the tone level of the output image signal does not increase monotonously.

FIG. 7 shows the sums of the output image signal densities for different printing patterns. FIG. 7(a) shows the condition that is identical to FIG. 6(c) and its total density is 40%. It is seen from FIGS. 6(b) and 6(c) that the theoretical density total of FIG. 7(a) is 50%.

FIG. 7(b) shows another print pattern whose theoretical density total is also 50%. The real density, however, is 45% because of the difference in the printing pattern. This is the result of offset or mutual interference between the thickened or thinned adjacent recording dots.

This indicates that an increase in the tone level of the input image signal does not necessarily result in a monotonous increase in the tone level of the output image signal. Thus, fine correction by the gamma conversion is difficult and does not produce a satisfactory solution.

SUMMARY OF THE INVENTION

A first object of this invention is to provide an image signal processor that prevents moire from appearing on the image made up of multi-level pixel signals output from the filter during the process of sharpening the image.

A second object of the invention is to provide an image signal processor that can reproduce alternating line images while preventing the occurrence of moire.

A third object is to provide an image signal processor that, without increasing the number of input bits, can reproduce a smooth halftone image in a wide tonal range even with a recording system which prints thickened or thinned dots.

To achieve the above-mentioned objects, the image signal processor of this invention has a filter constructed in such a way that a filter coefficient for pixels adjoining a pixel of interest in the main and sub scan directions on the image made up of multi-level pixel signals is set to a positive value, that a filter coefficient for pixels adjoining the pixel of interest in diagonal directions is set to a negative value and that the sum of these coefficients including a filter coefficient for the pixel of interest is unity.

With this configuration, of the pixel image signals fed to the filter, those signals corresponding to the pixels adjoining the pixel of interest in the main and sub scan directions have their high frequency components amplified by the filter while those corresponding to pixels adjoining the pixel of interest in diagonal directions have their high frequency components attenuated.

Hence, it is possible to eliminate moire from the pixel image signals that have power spectra in the diagonal 45° direction. Furthermore, since the high frequency components in the main and sub scan directions are amplified, it is possible to reproduce, emphasize and sharpen the line images.

For the purpose of realizing the third objective, the image signal processor of the invention comprises: an output image signal storage means for storing the output image signals which are binarized from the input image signals; a recording dot correction factor setting means for setting a difference between the theoretical dot size and the actual dot size produced by the recording system; and an error data correction means which receives the output of the output image signal storage means, the output of the recording dot correction factor setting means, and error data—which is the difference between the input image signal and the output image signal—to correct the error data.

With this configuration, the amount of correction is determined by using the black/white states of the pixel of interest and of the adjoining pixels, both output from the output image signal storage means, and also the correction factor set by the recording dot correction factor setting means. And the error data is corrected according to the amount of correction determined. The correction of error data is performed so that the sum of densities of input image signals in a localized area is equal to the sum of densities of output image signals. That is, $$\Sigma fmn = \Sigma gmn$$

This makes it possible to reproduce a halftone image with smooth gradation in a wide tonal range which is a precise representation of the overall density of input image signals, realizing a high-quality, reliable image signal processing.

These objects and features of this invention will become more apparent when one reads the following description of the preferred embodiment.

BRIEF DESCRIPTION OF THE DRAWINGS

Figure 3:
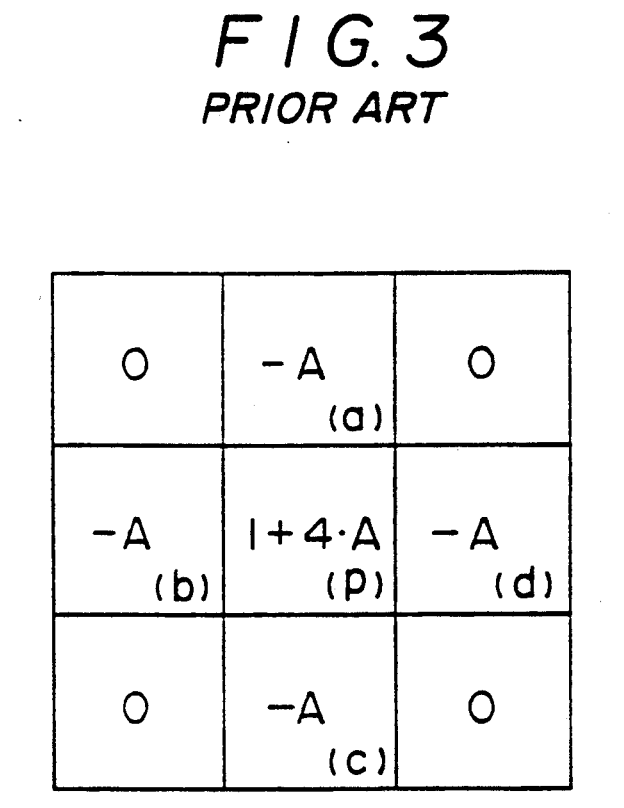

FIG. 3 is a diagram showing coefficients of the conventional Laplacean filter;

FIGS. 4(a)-(c) are diagrams showing the relationship between the sampling frequency used in reading an image and the frequency components of the screen image;

Figure 11:
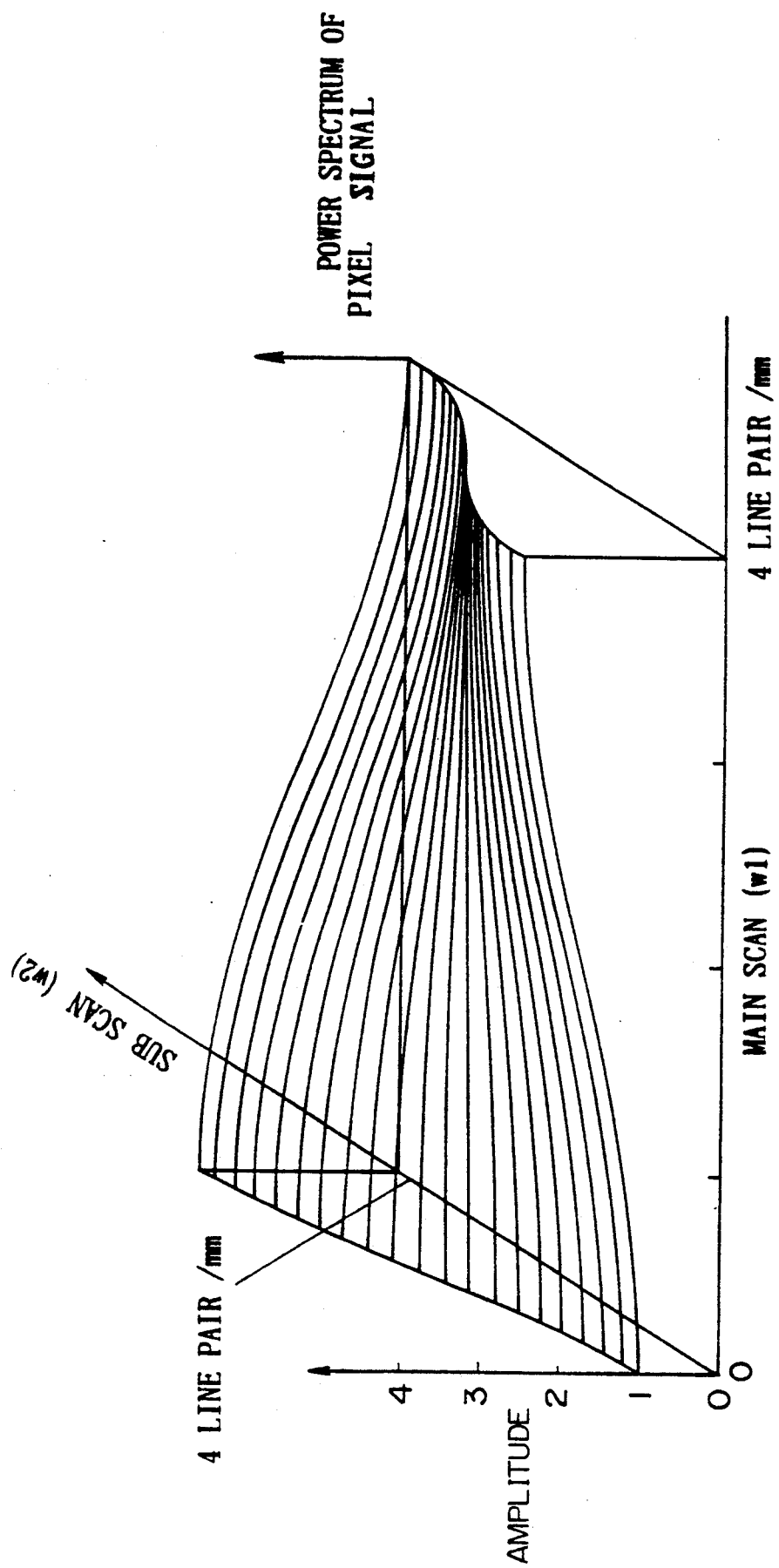
Figure 12:
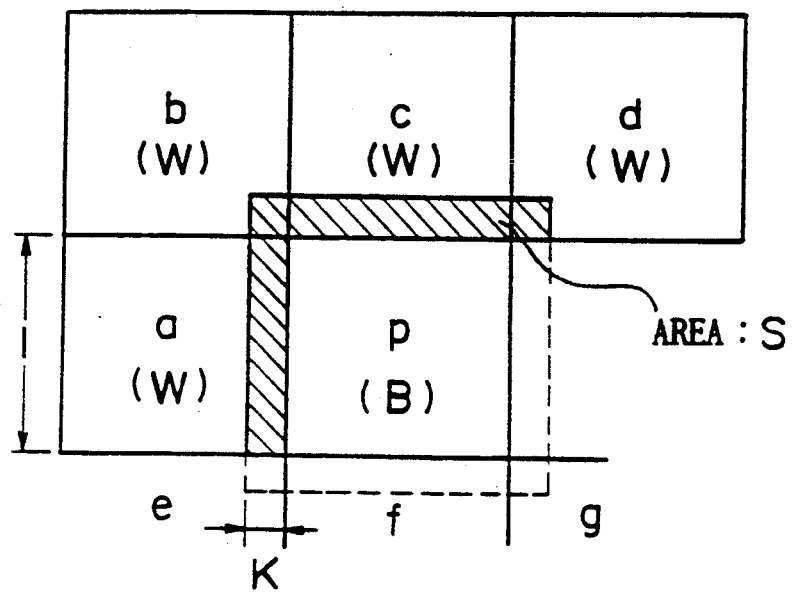
Figure 13:
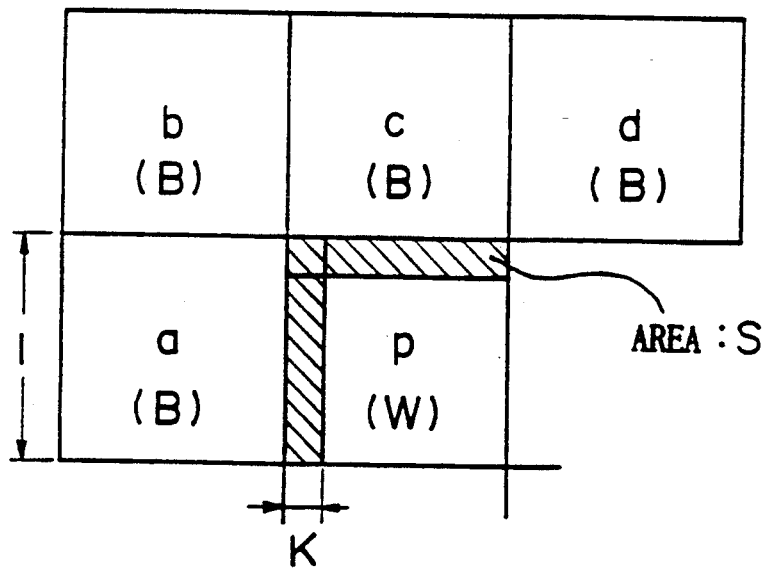

FIGS. A-B are diagrams showing the outline configuration of a spatial filter used in the embodiment;

Figure 10:
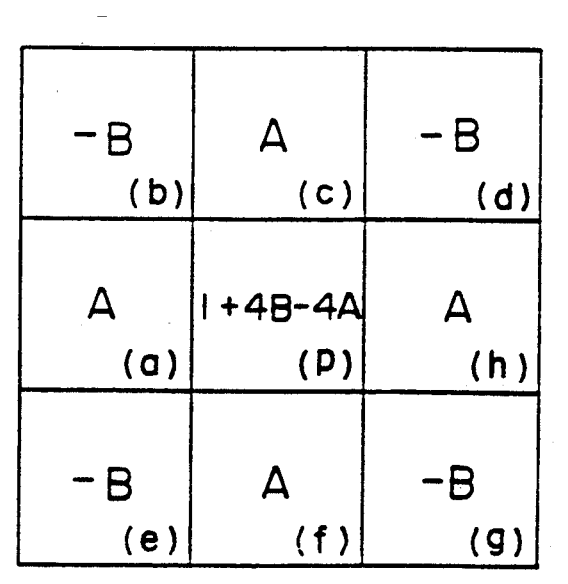

FIG. 10 is a diagram showing coefficients of the spatial filter;

FIG. 11 is a diagram showing the spatial frequency-versus-amplitude characteristic of the spatial filter;

FIG. 12 is a diagram showing the binarization process performed in the embodiment when a pixel of interest is black with all adjoining pixels being white; and FIG. 13 is a diagram showing the binarization process performed in the embodiment when a pixel of interest is white with all adjoining pixels being black.

DETAILED DESCRIPTION OF PREFERRED EMBODIMENT

Figure 8:
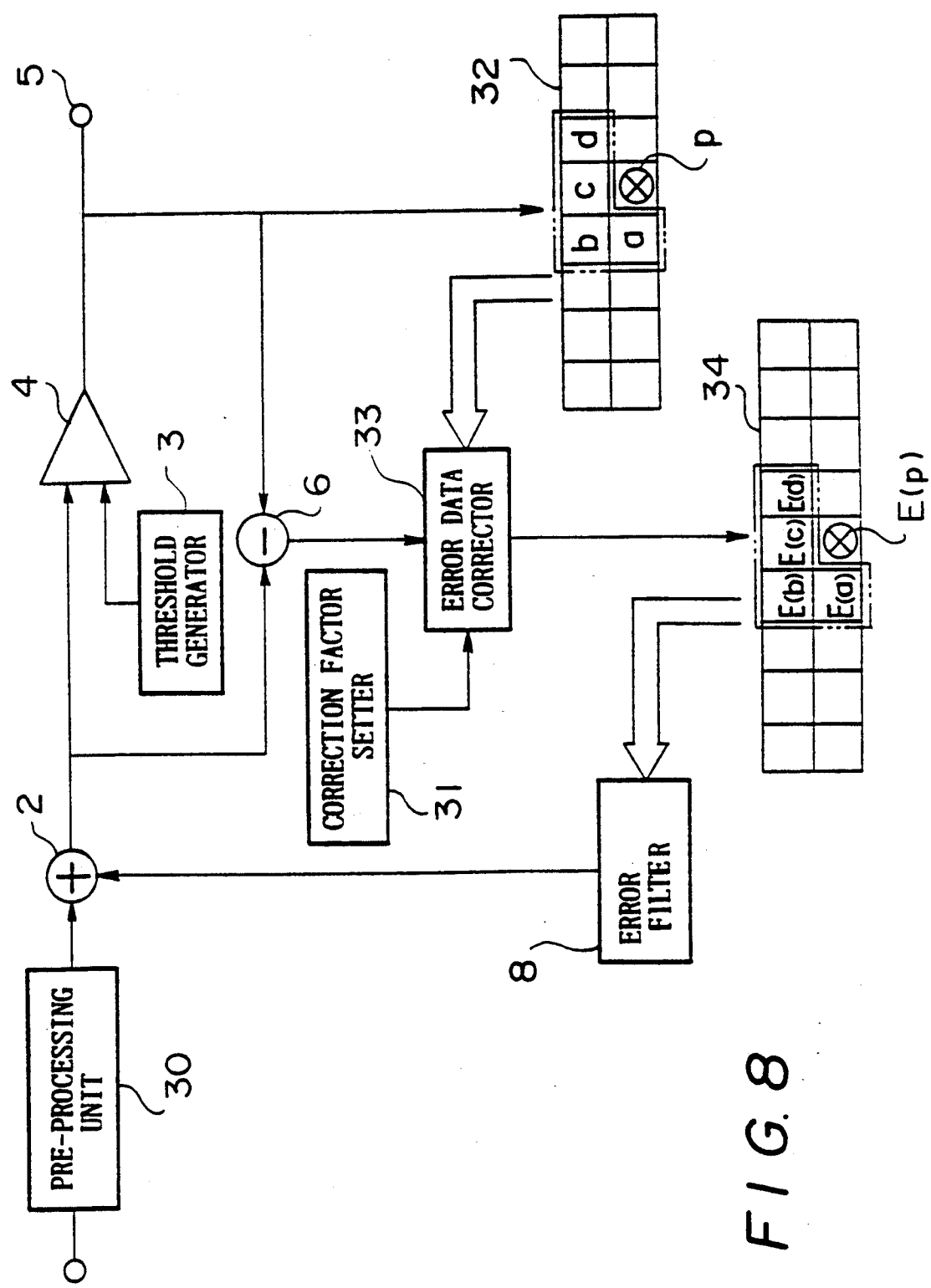
FIG. 8 is a block diagram showing the outline configuration of an image signal processor as one embodiment of this invention.

FIG. 8 shows the outline configuration of the image signal processor as one embodiment of this invention. In the figure, components with identical functions to those of the conventional processor are assigned the same reference numerals and their explanations are omitted. Reference numeral 30 represents a preprocessing unit made up of a spatial filter which performs preprocessing on the input image signals. Denoted 31 is a recording dot correction factor setter that sets a difference between the theoretical dot size and the actual dot size in the recording system. Designated 32 is an output image memory that stores two lines, in the main scan direction, of binarized pixel signals output from a comparator 4. Denoted 33 is an error data corrector that corrects the error data according to the output of the recording dot correction factor setter 31, the output of the output image memory 32, and the output of the subtractor 6. An error data memory 34 stores two lines, in the main scan direction, of corrected error data output from the error data corrector 33.

FIG. 9 shows an example circuit configuration of the spatial filter that makes up the preprocessing unit 30.

FIG. 10 is a matrix diagram showing the spatial filter coefficients for 3×3 pixels. Pixels adjoining a center pixel of interest in the main and sub scan directions are assigned a positive filter coefficient A, and pixels adjoining the center pixel in diagonal directions are assigned a negative filter coefficient A. To make the overall filter coefficient unity, the center pixel of interest is given a coefficient of 1+4B−4A.

In FIG. 9, denoted 41, 42 are 1-line buffers, of which the first 1-line buffer 41 accumulates the image signals one by one up to one line in the main scan direction, at which time the first-1-line buffer 41 shifts the whole one line of image signals into the second 1-line buffer 42 at a time. Designated 43, 44 are latch circuits that shift the image signals of one line stored in the 1-line buffer 42 one pixel at a time and generate pixel information about the pixels c, d in FIG. 10. Designated 45, 46 are latch circuits that, as with the above latch circuits, generates pixel information about the pixels P, h in FIG. 10 from the 1-line buffer 41. Denoted 47, 48 are latch circuits that similarly generate pixel information about the pixel f, g in FIG. 10. Adders 49, 50, 51 add up pixel information of those pixels that adjoin the pixel P of interest in the main and sub scan directions. A multiplier 52 multiplies the result of the addition with a positive coefficient A. Adders 53, 54, 55 add up pixel information of those pixels that adjoin the pixel of interest P in diagonal directions. A multiplier 56 multiplies the result of this addition with a negative coefficient −B. A multiplier 57 multiplies the pixel information of the pixel of interest P with the coefficient 1+4B−4A, a coefficient to make the overall filter coefficient unity. Adders 58, 59 add up pixel information, that has been multiplied with respective coefficients by the multipliers.

Now, the operation of the spatial filter with the above configuration will be explained.

The image signal is entered from a scanner not shown into this filter. The first line of image information in the main scan direction is saved in the 1-line buffer 41. When another line of image information is received, it is saved in the first 1-line buffer 41 after the information already contained in the line-line buffer 41 is shifted to the second 1-line buffer 42. This operation is repeated for each line received, generating the image signals for three lines at all times. Then the three lines of image signals are shifted one pixel at a time by the latch circuits 43-48 to generate an input image signal for each of the pixels in the 3×3 matrix of FIG. 10. These input image signals correspond to the pixels a-h, P in the matrix of FIG. 10.

As shown in FIG. 9, the multiplier 57 multiplies the pixel of interest p with the coefficient 1+4B−4A. And the adders 49, 50, 51 add up those pixels c, a, f, h adjoining the pixel of interest P in the main and sub scan directions. The multipliers 42 multiplies the result of the addition with a positive coefficient A. The adders 53, 54, 55 add up those pixels b, d, e, g adjoining the center pixel P in diagonal directions. And the multiplier 56 multiplies the result of this addition with a negative coefficient −B. The adders 58, 59 add up the results from the multipliers 57, 52, 56 to produce a filtered signal for the pixel of interest p. After this, the pixel of interest is shifted to the next pixel and the similar operation is carried out.

Figure 1:
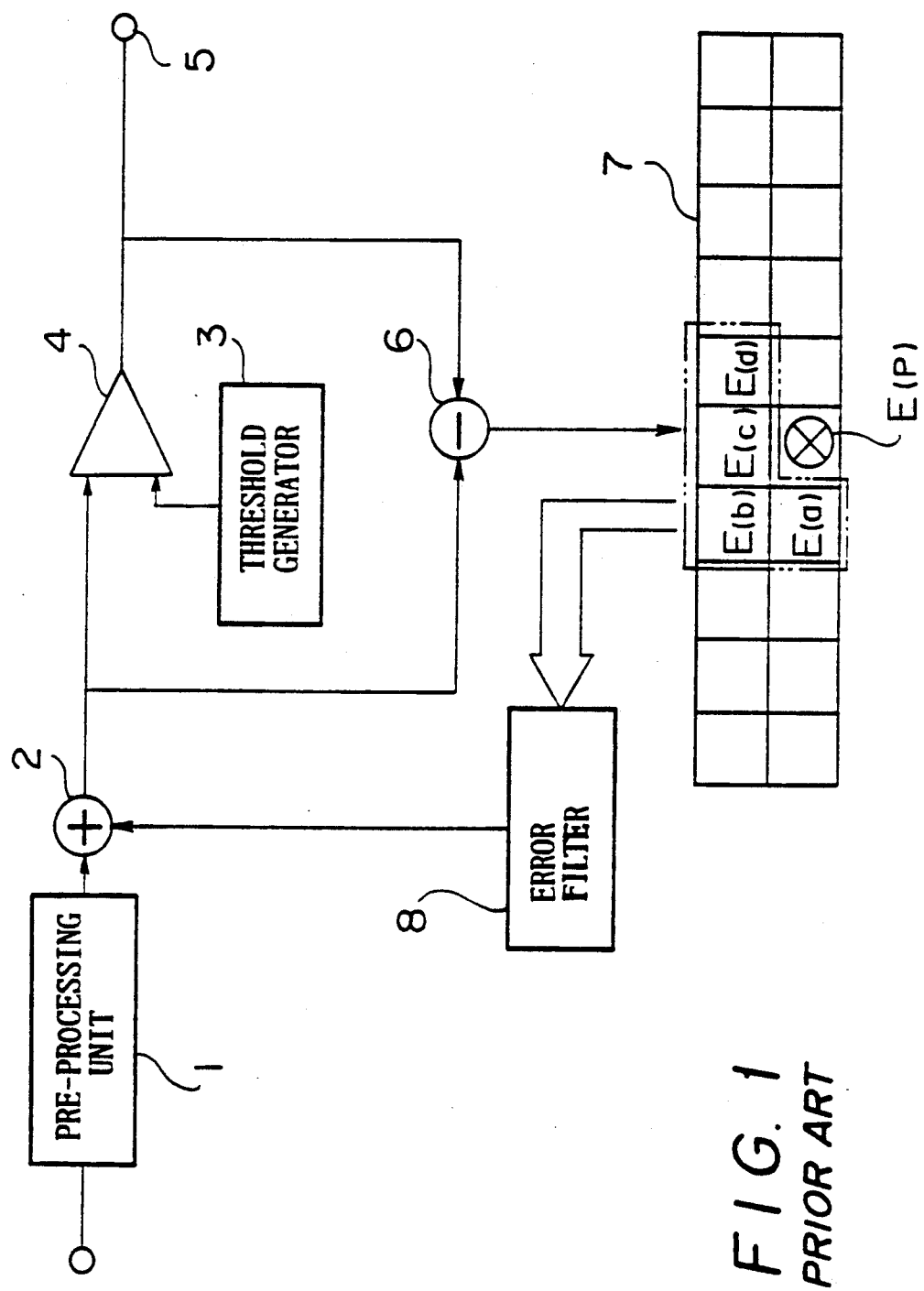
FIG. 1 is a block diagram showing the outline configuration of a conventional image signal processor.
Figure 2A:
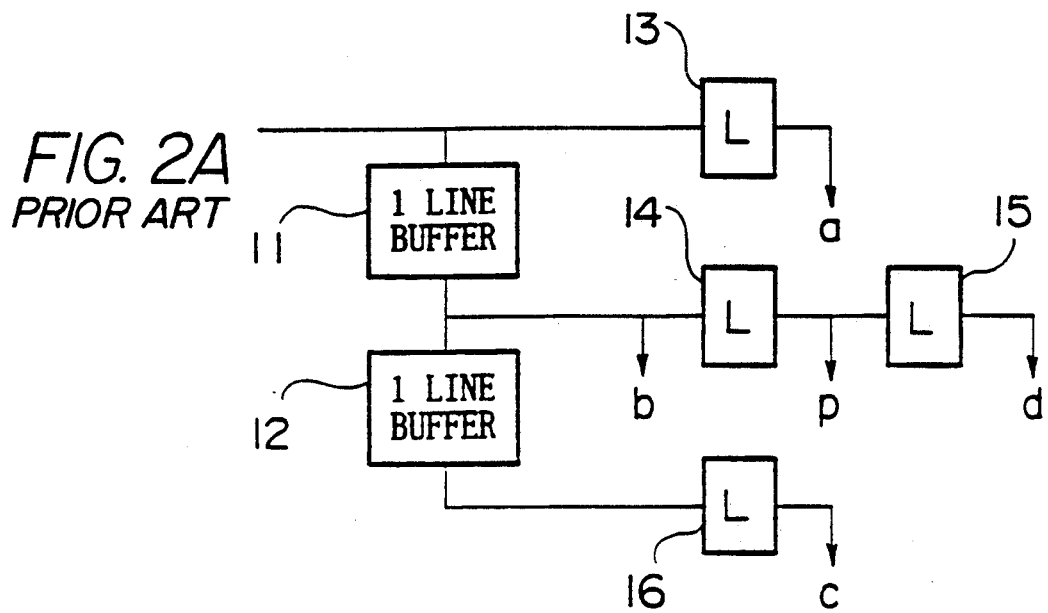
FIGS. 2A-B are diagrams showing the outline configuration of a conventional Laplacean filter used in the image signal processor of FIG. 1.
Figure 2B:
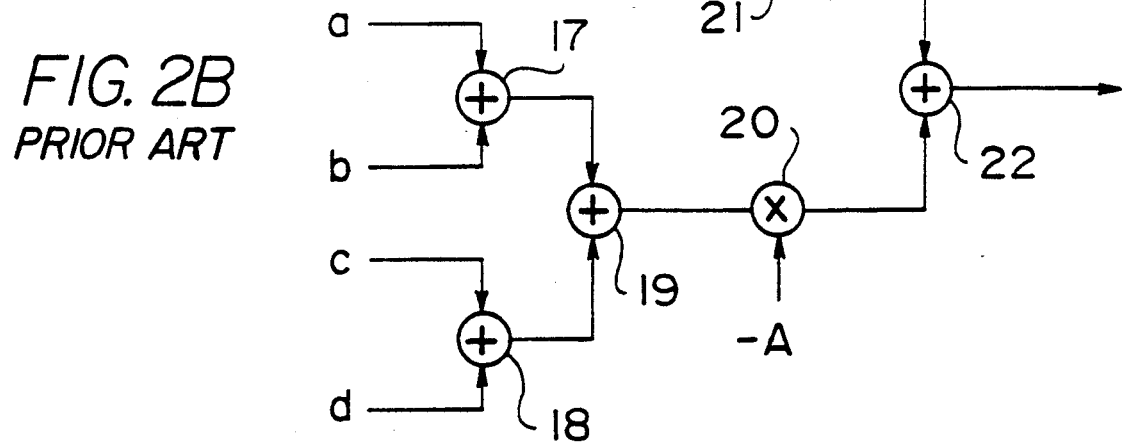
Figure 5:
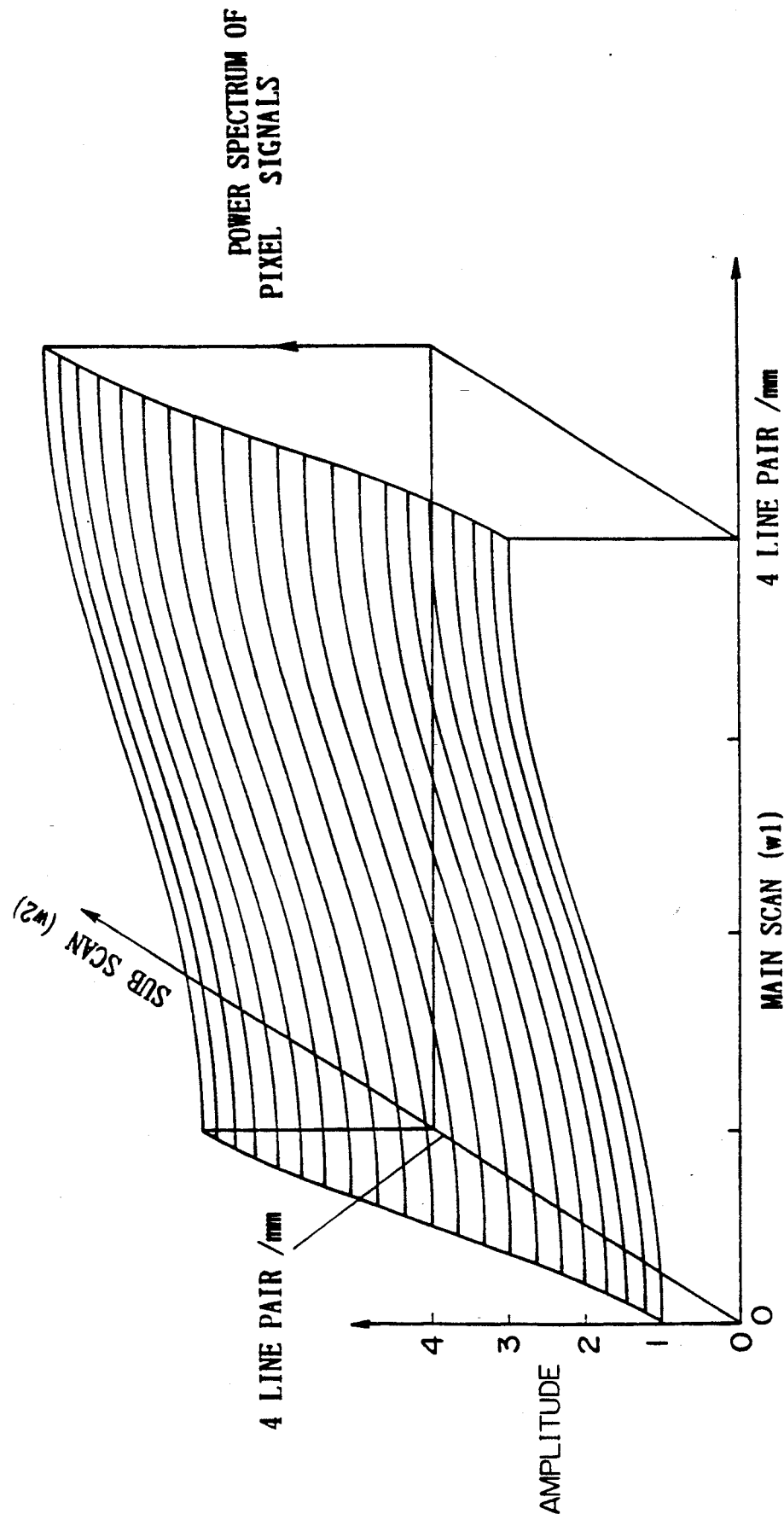
FIG. 5 is a diagram showing the spatial frequency-versus-amplitude characteristic of the conventional spatial filter.
Figure 6A:
FIGS. 6(a)-(c) diagrams showing a difference in density between the input image signals and the output image signals in the conventional image signal processor.
Figure 6B:
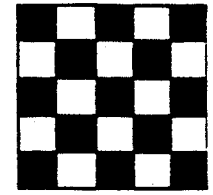
Figure 6C:
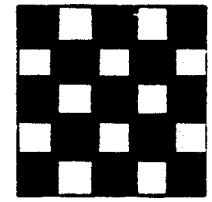
Figure 7A:
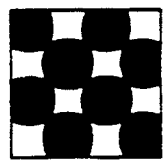
FIGS. 7(a)-(b) diagrams showing a density difference resulting from a difference in the dot pattern in the conventional image signal processor.
Figure 7B:
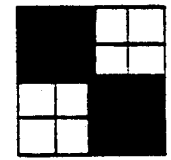

FIG. 11 shows the spatial frequency vs. amplitude characteristic in the image signal processor of this invention with A set to ⅛ and B to ¼. The figure shows the amplitude of the spatial filter with respect to a two-dimensional plane extending in the main and sub scan directions; in other words, it represents the amplitude characteristic for the pixel of interest and the adjoining pixels in the matrix of FIG. 10. When compared with FIG. 5 that indicates the amplitude characteristic of the conventional filter, it is noted that the amplitudes of pixels adjoining in the diagonal directions are minimal.

The frequency response in FIG. 11 can be given as a two-dimensional Fourier transform of the spatial filter coefficient h (k₁, k₂) and is expressed as $$H(e^{jw1}, e^{jw2}) = \sum_{k_1=-\infty}^{\infty} \sum_{k_2=-\infty}^{\infty} h(k_1, k_2) e^{-jw1 \cdot k1} e^{-jw2 \cdot k2}$$

$$= 3/2 + 1/4 \cdot (\cos W_1) + 1/4 \cdot (\cos W_2) - \cos W_1 \cdot \cos W_2$$

The matrix coefficients used in FIG. 10 is shown in the table below.

| h(−1, −1) = −¼ | h(0, −1) = ¼ | h(1, −1) = −¼ |
|---|---|---|
| h(−1, 0) = ¼ | h(0, 0) = 3/2 | h(1, 0) = ¼ |
| h(−1, 1) = −¼ | h(0, 1) = ¼ | h(1, 1) = −¼ |

In this way, this spatial filter attenuates the high frequency components of the pixel of interest in the diagonal directions and amplifies the high frequency components of the pixel in the main and sub scan directions, emphasizing the pixel image to produce a sharp and clear image.

While in the above description the image processing is started when the third line is read in the main scan direction, it is possible to start the image processing upon receiving the first line by registering two lines of artificial data along the main scan direction prior to receiving the image signal.

Where a scanner capable of reading three lines simultaneously is used or where the image data already stored in the page memory is processed, the line buffers may be omitted.

The image signal of the pixel of interest P preprocessed by the spatial filter in the preprocessing unit is entered into the adder 2. The adder 2 adds the output of the error filter 8 to this image signal. Then, the comparator 4 binarizes the output of the adder 2 according to the threshold value generated by the threshold generator 3 and outputs a binary result to the output terminal 5 and to the output image memory 32. The subtractor 3 subtracts the output of the comparator 4 from the output of the adder 2 to send the differential result as error data to the error data corrector 33.

Next, the error data corrector 33 takes in the error data from the subtractor 6, a correction factor k from a recording dot correction factor setter 31, and output image signals of the adjoining pixels a, b, c, d in FIG. 12 from the output image memory 32 to correct the error data for the pixel of interest P. The correction factor k is determined based on the difference in size between the actual dot in the recording system and the theoretical dot and is preset in the recording dot correction factor setter 31 according to the size of the dot produced by the recording system. The error data corrected by the corrector 33 is stored in the error data memory 34. The error filter 8 assigns weights to and adds up the binarized error data Error (a), Error(b), Error(c), Error (d) for the adjoining pixels stored in the error data memory 34. The result of the weighted addition is sent to the adder 2 where it is added to the input image signal of the pixel of interest P, as shown in FIG. 8.

The outline of operation as performed by the image signal processor of the invention has been described. The operation of the error data corrector J3 will be explained in more detail.

As a first example of operation, let us consider a case where the pixel of interest is black and the adjacent pixels are all white as shown in FIG. 12. In the figure, the shaded area represents a portion of the actual black dot produced that has protruded from the theoretical black dot boundary into the adjoining white dot areas. The correction on an area marked by a dashed line is performed during the correction process of the adjoining pixels e, f, g, h. The correction processing conforms to Table 1 and Table 2 shown later. If we let the width of the overflow region in FIG. 12 be k (the correction factor described earlier) and the width of a theoretical dot be 1, then the area S of the shaded portion is given by $$S = 2l + 2k^2$$

Let W stand for the signal level of the white input image signal. Then the amount of correction C is expressed as $$C = (2k + 2k^2) \times W$$

If the error data id $e_{mn}$, the corrected error data $e'_{mn}$ is given by $$e'_{mn} = e_{mn} + (2k + 2k^2) \times W$$

Next, as a second example of operation, let us consider a case where the pixel of interest is white and the adjoining pixels are all black. In the figure, the shaded area represents a part of the theoretical white dot that is missing from the actual white dot. As in the first operation example, the area of the shaded portion S is given by $$S = 2k - k^2$$

Assuming the signal level of the white input image signal to be W, the amount of correction C is defined as $$C = (2k - k^2) \times W$$

If the error data is $e_{mn}$, then the corrected error data $e'_{mn}$ is expressed as $$e'_{mn} = e_{mn} + (2k - k^2) \times W$$

Likewise, for all white/black combinations of the pixel of interest P and the adjoining pixels a, b, c, d, the amount of corrections C can be determined. If we let $e_{mn}$ stand for the error data for any arbitrary correction value C, the corrected error data $e'_{mn}$ is expressed generally as $$e'_{mn} = e_{mn} + C$$

Table 1 shows the correction values C when the pixel of interest P is black and Table 2 shows the correction values C when it is white.

TABLE 1

| Pixel of interest P | Adjoining pixels | | | | Amount of correction C |
|---|---|---|---|---|---|
| | a | b | c | d | |
| 0 | 0 | 0 | 0 | 0 | 0 |
| 0 | 0 | 0 | 0 | 1 | 0 |
| 0 | 0 | 0 | 1 | 0 | W × (k − 2k²) |
| 0 | 0 | 0 | 1 | 1 | W × (k) |
| 0 | 0 | 1 | 0 | 0 | 0 |
| 0 | 0 | 1 | 0 | 1 | 0 |
| 0 | 0 | 1 | 1 | 0 | W × (k − 2k²) |
| 0 | 0 | 1 | 1 | 1 | W × (k) |
| 0 | 1 | 0 | 0 | 0 | W × (k − k²) |
| 0 | 1 | 0 | 0 | 1 | W × (k − k²) |
| 0 | 1 | 0 | 1 | 0 | W × (2k − 3k²) |
| 0 | 1 | 0 | 1 | 1 | W × (2k − k²) |
| 0 | 1 | 1 | 0 | 0 | W × (k − k²) |
| 0 | 1 | 1 | 0 | 1 | W × (k − k²) |
| 0 | 1 | 1 | 1 | 0 | W × (2k) |
| 0 | 1 | 1 | 1 | 1 | W × (2k + 2k²) |

NOTE: W represents the signal level of a white input image signal. 1 indicates white and 0 indicates black.

TABLE 2

| Pixel of interest P | Adjoining pixels | | | | Amount of correction C |
|---|---|---|---|---|---|
| | a | b | c | d | |
| 1 | 0 | 0 | 0 | 0 | W × (2k − k²) |
| 1 | 0 | 0 | 0 | 1 | W × (2k − k²) |
| 1 | 0 | 0 | 1 | 0 | W × (k + k²) |
| 1 | 0 | 0 | 1 | 1 | W × (k) |
| 1 | 0 | 1 | 0 | 0 | W × (2k − k²) |
| 1 | 0 | 1 | 0 | 1 | W × (2k − k²) |
| 1 | 0 | 1 | 1 | 0 | W × (k + k²) |
| 1 | 0 | 1 | 1 | 1 | W × (k) |

TABLE 2-continued

| Pixel of interest P | Adjoining pixels | | | | Amount of correction C |
|---|---|---|---|---|---|
| | a | b | c | d | |
| 1 | 1 | 0 | 0 | 0 | W × (k) |
| 1 | 1 | 0 | 0 | 1 | W × (k) |
| 1 | 1 | 0 | 1 | 0 | W × (2k²) |
| 1 | 1 | 0 | 1 | 1 | W × (k²) |
| 1 | 1 | 1 | 0 | 0 | W × (k) |
| 1 | 1 | 1 | 0 | 1 | W × (k) |
| 1 | 1 | 1 | 1 | 0 | W × (k²) |
| 1 | 1 | 1 | 1 | 1 | 0 |

NOTE: W represents the signal level of a white input image signal. 1 indicates white and 0 indicates black.

Referring to these tables, the operation of the error data corrector 33 will be explained.

The error data corrector 33 receives the error data $e_{mn}$ for the pixel of interest P from the subtractor 6. At the same time, the error data corrector 33 also takes in the correction factor k from the recording dot correction factor setter 31 and a 5-bit signal from the output image memory that indicates whether the pixel of interest P and the adjoining pixels a, b, c, d are white (1) or black (0).

Next, the error data corrector 33 determines the correction value C by referencing the 5-bit signal to Table 1 and Table 2, and then adds the correction value C and the error data $e_{mn}$ to obtain the corrected error data $e'_{mn}$.

The advantages of this embodiment may be summarized as follows.

The image signal processor of the invention consists of: an output image signal storing means that stores output image signals; a recording dot correction factor setting means that sets a difference between the real dot size produced in the recording system and the theoretical dot size; and an error data correction means that receives the output of the output image signal storing means, the output of the recording dot correction factor setting means, and error data which is a difference between the input image signal and the output image signal, to correct the error data. This image signal processor enables a precise correction of the error data by using the black/white status signal for the pixel of interest and the adjoining pixels from the output image memory and the correction factor k from the recording dot correction factor setting means. This in turn makes it possible to equalize the sum of the densities of input image signals over a specified localized area to the sum of the densities of output image signals, thus reproducing a halftone image with a smooth gradation in a wide tonal range.

While in this embodiment the thickened dot is modeled as a square, it may be modeled as a circle. Since the diagonally adjacent pixels (b, d in FIG. 12) relative to the pixel of interest have relatively small influences, it is possible to reference only the pixels adjoining the pixel of interest in the main and sub scan directions (a, c in FIG. 12) in order to reduce the amount of processing performed. The precision of the image signal processing can further be enhanced by improving the calculation formula used by the error filter.

Although in the above embodiment the image signal level correction is applied to the thickened dots that would occur in such printing system as a laser beam printer, it can also be used for correcting the thinned dots that may occur in a thermal printing system depending on the direction of scanning.

Moreover, while the image signal processing in this embodiment has been described as requiring the first line of data in the main and sub scan directions as the reference data, artificial data may instead be registered to enable the image signal processing to start with the first pixel scanned.

Although the present invention has been described by referring to the attached drawings in relation to the embodiments shown therein, various modifications may be made by those skilled in the art without departing the spirit of the present invention.

What is claimed is:

1. An image signal processor for equalizing the sum of densities of output image signals to the sum of densities of input image signals in pixels of a localized area in a recording system in which an actual size of a recording dot designated by one of the output image signals is larger or smaller than a theoretical size of the recording dot, comprising:

binarizing means for binarizing input image signals of a pixel of interest and pixels adjoining the pixel of interest to produce output image signals of the pixel of interest and the pixels adjoining the pixel of interest, each of the input image signals being in a halftone level, and each of the output image signals being in a binarized level such as a white level or a black level;

error data producing means for subtracting the output image signal of the pixel of interest for subtracting the output image from the input image signal of the pixel of interest to produce error data of the pixel of interest;

output image signal storing means for storing the output image signals binarized by the binarizing means;

recording dot correction factor setting means for setting a correction factor relating to a difference between the actual size of the recording dot and the theoretical size of the recording dot; and error data correcting means for calculating a differential area between an actual size of a recording dot designated by the output image signal of the pixel of interest and a theoretical size of the recording dot with the correction factor set by the recording dot correction factor setting means while considering the white and black levels of the output image signal stored in the output image signal storing means, calculating amount of correction with the differential area, and correcting the error data produced by the error data producing means with the amount of correction to equalize the sum of the densities of the output image signals to the sum of densities of the input signals in the pixels of the localized area, the density of an output image signal being defined as a product of the white or black level of the output image signal and the actual size of a recording dot designated by the output image signal, and the density of an input image signal being defined as a product of a halftone level of the input image signal and the theoretical size of the recording dot.

2. An image signal processor as claimed in claim 1, wherein the amount of correction is added to the error data in the error data correcting means to produce corrected error data of the pixel of interest, the corrected error data being added to the input image signal of the pixel of interest to correct the output image signal of the pixel of interest, and each of the pixels in the localized area being treated as a pixel of interest one after another to equalize the sum of the densities of the output image signals to the sum of densities of the input image signals in the pixels of the locallized area.

3. An image signal processor as claims in claim 1, wherein the correction factor is preset in the recording dot correction factor setting means.

4. An image signal processor as claimed in claim 1, additionally including error data storage means for storing the error data corrected by the error data correcting means.

5. An image signal processor as claimed in claim 4, wherein said error data storage means stores the corrected error data for the binarized output image signals in the order that they are received.

6. An image signal processor as claimed in claim 4 wherein said error data storage means is connected with an error filter, which assigns weights to the error data of the pixels adjoining the pixel of interest stored in the error data storage means, adds up these weighted error data, and adds the sum to the input image signal of the pixel of interest.

7. An image signal processor as claimed in claim 5, wherein said data error storage means is connected with an error filter, which assigns weights to the error data of the pixels adjoining the pixel of interest scored in the error data storage means, adds up these weighted error data, and adds the sum to the input image signal of the pixel of interest.

* * * * *